US008092711B2

(12) United States Patent
Okada et al.

(10) Patent No.: US 8,092,711 B2
(45) Date of Patent: Jan. 10, 2012

(54) LIQUID CRYSTAL COMPOUND, POLYMERIZABLE LIQUID CRYSTAL COMPOSITION, OPTICALLY ANISOTROPIC MATERIAL, OPTICAL ELEMENT AND OPTICAL INFORMATION WRITING/READING DEVICE

(75) Inventors: Satoshi Okada, Koriyama (JP); Makoto Hasegawa, Koriyama (JP); Hiroshi Kumai, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/958,872

(22) Filed: Dec. 2, 2010

(65) Prior Publication Data

US 2011/0069241 A1    Mar. 24, 2011

Related U.S. Application Data

(63) Continuation of application No. PCT/JP2009/060293, filed on Jun. 4, 2009.

(30) Foreign Application Priority Data

Jun. 6, 2008  (JP) ................................. 2008-149416

(51) Int. Cl.
*C09K 19/00*   (2006.01)
*C09K 19/06*   (2006.01)
*C09K 19/32*   (2006.01)
*C09K 19/52*   (2006.01)

(52) U.S. Cl. ........... 252/299.6; 252/299.01; 252/299.62; 252/299.63; 428/1.1; 430/20; 349/1; 349/56; 349/86; 349/182; 349/183

(58) Field of Classification Search .............. 252/299.01, 252/299.6, 299.62–3; 428/1.1; 430/20; 560/116, 560/194, 220; 349/1, 56, 86, 182–3, 193
See application file for complete search history.

(56) References Cited

U.S. PATENT DOCUMENTS

| 6,613,245 | B1 | 9/2003 | Ohlemacher et al. |
| 7,405,026 | B2 * | 7/2008 | Kawakami ............... 252/299.01 |
| 2005/0127354 | A1 | 6/2005 | Hanna et al. |
| 2006/0049381 | A1 | 3/2006 | Klein et al. |

FOREIGN PATENT DOCUMENTS

| EP | 1 626 079 | 2/2006 |
| JP | 2001-302578 | 10/2001 |
| JP | 2002-521354 | 7/2002 |
| JP | 2004-6754 | 1/2004 |
| JP | 2004-143392 | 5/2004 |
| JP | 2004-263037 | 9/2004 |
| JP | 2005-317440 | 11/2005 |
| WO | 2008/061606 | 5/2008 |

OTHER PUBLICATIONS

International Search Report issued Sep. 8, 2009 in PCT/JP09/060293 filed Jun. 4, 2009.

\* cited by examiner

*Primary Examiner* — Geraldina Visconti
(74) *Attorney, Agent, or Firm* — Oblon, Spivak, McClelland, Maier & Neustadt, L.L.P.

(57) ABSTRACT

A liquid crystal compound having a good durability against light, a polymerizable liquid crystal composition and an optically anisotropic material are provided. Further, an optical element having a good durability against light and an optical information writing/reading device employing such an element are provided.
The liquid crystal compound is represented by a general formula $CH_2=CR^1—COO-(L)_k-E^1-E^2-(E^3)_m-R^2$. $E^1$ is preferably a trans-2,6-decahydronaphthalene group and $E^2$ is preferably a trans-1,4-cyclohexylene group. A phase difference plate 4 produced by employing the compound has a good durability against light, and accordingly, it is possible to achieve an optical head device employing a blue laser as a light source 1 and being suitable for large capacity writing/reading.

8 Claims, 3 Drawing Sheets

LIQUID CRYSTAL COMPOUND, POLYMERIZABLE LIQUID CRYSTAL COMPOSITION, OPTICALLY ANISOTROPIC MATERIAL, OPTICAL ELEMENT AND OPTICAL INFORMATION WRITING/READING DEVICE

TECHNICAL FIELD

The present invention relates to a liquid crystal compound, a polymerizable liquid crystal composition, an optically anisotropic material, an optical element and an optical writing/reading device.

BACKGROUND ART

On a surface of an optical disk such as a CD (compact disk) or a DVD (digital versatile disk), concaves and convexes called as pits are provided. An optical head device is a device for radiating a laser beam to an optical disk and detecting light reflected from the disk to read an information recorded in the pits.

For example, linearly polarized light emitted from a light source is transmitted through a beam splitter, a collimator lens, a phase difference plate and an objective lens to reach an information recording plane of an optical disk. In this outgoing path, the linearly polarized light is straightly transmitted through the beam splitter and transformed into circularly polarized light by the phase difference plate. The circularly polarized light is reflected by the information recording plane of the optical disk to be circularly polarized light in the reverse direction, and is transmitted through the objective lens, the phase difference plate and the collimator lens in the returning path in the reverse order to the order of the outgoing path. In the returning path, the light is transformed by the phase difference plate into linearly polarized light polarized in a direction perpendicular to that of incident light. Accordingly, light in the returning path is linearly polarized in a direction 90° different from that of the light in the outgoing path, whereby the propagation direction of the light is turned by 90° by the beam splitter and the light reach a photodetector.

In the optical head device, if e.g. fluctuation of tilt of the optical disk occurs, the focal position of beam spot deviates from the recording surface. Accordingly, a servo mechanism for detecting and compensating such a deviation to make the beam spot follow the concave/convex pits in the recording surface. Such a mechanism is configured to adjust the focus of the beam spot emitted from a laser light source on the recording surface to detect a tracking position, so that the beam spot follows an objective track. Further, in the optical head device, it is necessary to prevent a laser beam reflected by the recording surface without hitting the pits from returning to the light source.

For these reasons, the optical head device requires an optical element for modulating (polarizing, diffracting, phase-adjusting, etc.) the laser beam from the light source. For example, the above phase difference plate has a function of effecting different refractive index depending on the angle between the optical axis of the phase difference plate and the phase plane of incident light, and shifting the phases of the two components of light produced by birefringence. The two light components having phases shifted from each other are synthesized when the light is output from the phase difference plate. The magnitude of the shift of the phase is determined by the thickness of the phase difference plate. Accordingly, by adjusting the thickness, a quarter wavelength plate for shifting the phase by $\pi/2$, a half wavelength plate for shifting the phase by $\pi$, etc. can be produced. For example, linearly polarized light passed through a quarter wavelength plate becomes circularly polarized light, but linearly polarized light passed through a half wavelength plate becomes linearly polarized light having a polarization plane tilted by 90°. By using such a characteristic and combining a plurality of optical elements, the above servo mechanism can be constructed. Further, the above optical element is employed also for preventing a laser beam reflected by the recording surface without hitting pits from returning to the light source.

The above optical element can be produced by employing a liquid crystal material. For example, a liquid crystal molecule having a polymerizable functional group has both a characteristic of polymerizable monomer and a characteristic of liquid crystal. Accordingly, when such liquid crystal molecules each having a polymerizable functional group are aligned and polymerized, an optically anisotropic material wherein alignment of the liquid crystal molecules are fixed can be obtained. Such an optically anisotropic material has an optical anisotropy such as a refractive index anisotropy derivable from a mesogenic structure, and by using this characteristic, a diffraction element or a phase difference plate is produced. As such an optically anisotropic material, for example, Patent Document 1 discloses a polymer liquid crystal obtained by polymerizing a liquid crystal composition containing a compound represented by $CH_2=CH-COO-Ph-OCO-Cy-Z$ (Z: alkyl group).

By the way, the above optical element will be commonly required to have the following characteristics.

1) The optical element has an appropriate retardation value (Rd value) depending on wavelength to be used and application of the element.

2) Optical characteristics (Rd value, transmittance, etc.) are uniform in the entire surface of the optical element.

3) There is little scattering or absorption at the wavelength to be used.

4) Optical characteristics of the optical element can be easily adjusted to those of other materials constituting the element.

5) Wavelength dispersion of the refractive index or the refractive index anisotropy is small at wavelength to be used.

Particularly, it is important to have a proper Rd value indicated in item 1). Here, Rd value is a value defined by a formula, $Rd = \Delta n \times d$ where $\Delta n$ is a refractive index anisotropy and d is the thickness of the optical element in the propagation direction of light. In order to obtain a desired Rd value, if $\Delta n$ of a liquid crystal material forming the optical element is small, it is necessary to increase the thickness d. However, if the thickness d increases, it becomes difficult to align the liquid crystal molecules, whereby it becomes difficult to obtain a desired optical characteristic. On the other hand, if $\Delta n$ is large, it is necessary to decrease the thickness d, and in this case, it becomes difficult to precisely control the thickness. Accordingly, it is very important for such a liquid crystal material to have a proper $\Delta n$ value.

In recent years, in order to increase the capacity of optical disks, use of laser beam having a shorter wavelength for writing or reading of an information has been in progress to reduce the concave/convex pit size of optical disks. For example, a laser beam having a wavelength of 780 nm is used for CDs, a laser beam having a wavelength of 650 nm is used for DVDs, and a laser beam having a wavelength of 405 nm is used for BDs (Blu-ray Disk) or HDDVDs (High-Definition Digital Versatile Disk).

In next-generation recording media, still shorter wavelength may be used, and use of a laser beam (hereinafter it is also referred to as blue laser beam) having a wavelength of from 300 to 450 nm, tends to increase from now on. However, the optically anisotropic material described in Patent Document 1 is insufficient in the durability against a blue laser beam.

For example, when a phase difference plate prepared by employing such a liquid crystal is disposed in an optical head device using a blue laser beam as a light source, there occurs generation of aberration, decrease of the transmittance or change of the Rd value in the lapse of time in some cases. This is considered to be because the material of the phase different plate is damaged by exposure to the blue laser beam. If such an aberration is generated, light (light flux) emitted from the light source and transmitted through a collimator lens, a phase difference plate and an objective lens, cannot be focused into a point when it reaches a surface of a recording medium. As a result, light-utilization efficiency decreases and efficiency of reading or writing of an information decreases. Further, when the transmittance decreases, the intensity of light reaching the surface of the recording medium or photodetector becomes low, and in the same manner as above, the efficiency of reading or writing of an information decreases. Further, when the Rd value changes, for example, in a wavelength plate, it is not possible to maintain a desired ellipticity or the extinction ratio of linearly polarized light. As a result, the optical device may not function as an optical head device.

By the way, in order to reduce the size and increase the efficiency of an optical element, it is usually necessary to use a material having a high refractive index anisotropy. In general, a material having a high refractive index anisotropy has a high refractive index. However, since such a high refractive index material has a large wavelength dispersion of refractive index, such a material tends to have a high absorption of short wavelength light (that is, such a material has a high molar extinction coefficient). Accordingly, conventional high refractive index materials have a problem that they have low durability against short wavelength light such as a blue laser beam.

In order to improve durability against light, it is preferred to employ a material having a low molar extinction coefficient such as a compound having a complete alicyclic structure containing no aromatic ring. However, a complete alicyclic liquid crystal monomer usually has a small Δn, and there are problems that a polymer obtained from such a monomer has a further small Δn or such a polymer becomes isotropic, whereby it becomes difficult to obtain a desired liquid crystallinity.

For example, the following two complete alicyclic liquid crystal monomers exhibit optical anisotropy (birefringence), but form an isotropic polymer by polymerization.

For this reason, it is necessary to mix each of these monomers with another compound to form an anisotropic polymer. However, since the temperature range in which the above monomers show optical anisotropy is not wide, it is difficult to form a composition having a desired liquid crystallinity even if each of the monomers are mixed with another compound.

PRIOR ART

Patent Documents
Patent Document 1: JP-A-2004-263037

DISCLOSURE OF THE INVENTION

Problems to be Solved by the Invention

The present invention has been made considering the above problems. Namely, an optical element for modulating a laser beam having an wavelength of from 300 nm to 450 nm, is required to employ an optically anisotropic material which shows little degradation even if it is exposed to light in this wavelength band and excellent in the durability, and which is also excellent in liquid crystallinity. For such an anisotropic material, the structure of a liquid crystal compound is extremely important. Under the circumstances, it is an object of the present invention to provide a liquid crystal compound which has a good durability against a blue laser beam and which shows a desired liquid crystallinity after polymerization; and a polymerizable liquid crystal composition containing such a liquid crystal compound.

Further, it is an object of the present invention to provide an optical anisotropic material excellent in the durability against a blue laser beam.

Further, it is an object of the present invention to provide an optical element excellent in the durability against a blue laser beam and an optical information writing/reading device employing such an optical element.

Other objects and merits of the present invention will be clarified from the following descriptions.

Means for Solving the Problems

A first embodiment of the present invention relates to a liquid crystal compound represented by the following formula (1):

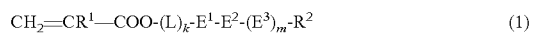 (1)

wherein $R^1$ is a hydrogen atom or a methyl group;

$R^2$ is a $C_{1-8}$ alkyl group or a fluorine atom, and when $R^2$ is an alkyl group, an etheric oxygen atom may be present in a carbon-carbon bond or at an end of the group to be bonded to a cyclic group, and a part or all of hydrogen atoms may be substituted by fluorine atoms;

K is 0 or 1;

L is $-(CH_2)_p COO-$, $-(CH_2)_q OCO-$, $-(CH_2)_r O-$ or $-(CH_2)_s-$ (wherein p, q, r and s are each independently an integer of from 1 to 8);

$E^1$ and $E^2$ are each independently a trans-1,4-cyclohexylene group or a trans-2,6-decahydronaphthalene group, and at least one of $E^1$ and $E^2$ is a trans-2,6-decahydronaphthalene group (wherein in the trans-1,4-cyclohexylene group and the trans-2,6-decahydronaphthalene group in $E^1$ and $E^2$, hydrogen atoms bonded to carbon atoms in the groups may be each substituted by a fluorine atom or a methyl group);

$E^3$ is a trans-1,4-cyclohexylene group or a 1,4-phenylene group (wherein in the trans-1,4-cyclohexylene group and the 1,4-phenylene group in $E^3$, hydrogen atoms bonded to carbon atoms in these groups may be each substituted by a fluorine atom or a methyl group); and m is 0 or 1.

In the first embodiment of the present invention, it is preferred that $E^1$ is a trans-2,6-decahydronaphthalene group, and $E^2$ is a trans-1,4-cyclohexylene group.

It is preferred that the liquid crystal compound is represented by the following formula (1A):

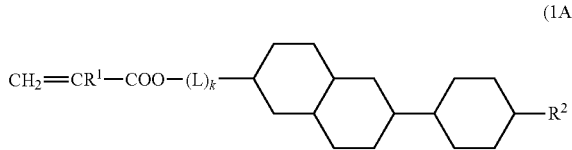

(1A)

wherein $R^1$ is a hydrogen atom, and $R^2$ is a $C_{2-6}$ linear alkyl group or a fluorine atom.

Further, it is preferred that k is 1 and L is —$(CH_2)_pCOO$— or $(CH_2)_qOCO$—. In particular, it is preferred that L is —$(CH_2)_pCOO$— wherein p is an integer of from 2 to 4.

Further, it is preferred that k is 0.

A second embodiment of the present invention relates to a polymerizable liquid crystal composition containing the liquid crystal compound of the first embodiment of the present invention.

A third embodiment of the present invention relates to an optically anisotropic material comprising a polymer of the polymerizable liquid crystal composition of the second embodiment of the present invention.

A fourth embodiment of the present invention relates to an optical element employing the optically anisotropic material of the third embodiment of the present invention.

A fifth embodiment of the present invention relates to an optical information writing/reading device for recording an information in an optical recording medium and/or reading an information recorded in an optical recording medium, which has the optical element of the fourth embodiment of the present invention.

EFFECTS OF THE INVENTION

By the first embodiment of the present invention, it is possible to obtain a liquid crystal compound which has a good durability against a blue laser beam, and which provides a desired liquid crystallinity after polymerization.

By the second embodiment of the present invention, it is possible to obtain a polymerizable liquid crystal composition which has a good durability against a blue laser beam, and which provides a desired liquid crystallinity after polymerization.

By the third embodiment of the present invention, it is possible to obtain an optically anisotropic material having a good durability against a blue laser beam.

By the fourth embodiment of the present invention, it is possible to obtain an optical element having a good durability against: a blue laser beam.

By the fifth embodiment of the present: invention, it is possible to obtain an optical information writing/reading device suitable for large capacity writing/reading.

MODE FOR CARRYING OUT THE INVENTION

Figure 1:
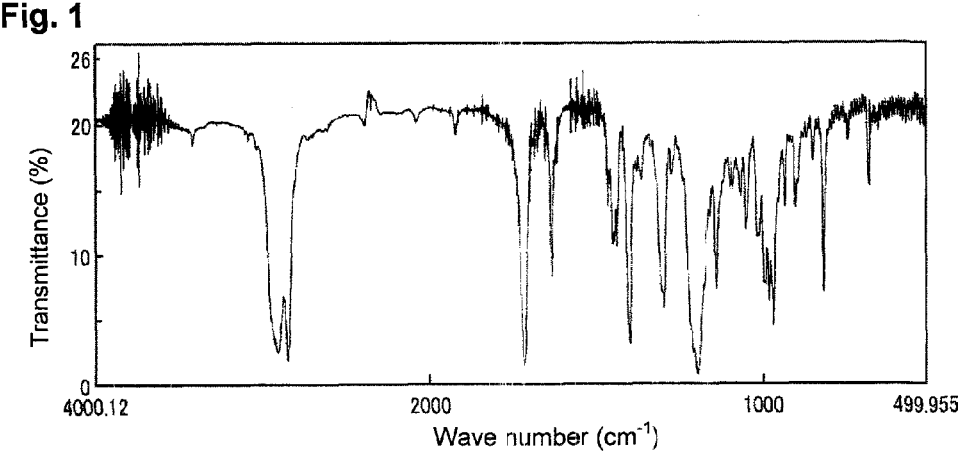
FIG. 1 is a view showing an IR spectrum of compound (1A-1b) of the present invention.

So far, it is known that a complete alicyclic compound wherein a trans-1,4-cyclohexylene group is substituted by a trans-2,6-decahydronaphthalene group shows improved liquid crystallinity. For example, Patent Document 2 (JP-A-57-130929), Patent Document 3 (JP-A-2001-002619) and Non-Patent Document 1 (Chimia, 1982, vol. 36, p. 460-462) report as to a trans-2,6-di substituted trans-decahydronaphthalene derivative. However, these compounds are all non-polymerizable liquid crystal compounds.

Under the circumstances, the present inventors have conducted extensive studies, and as a result, they have discovered that the compound represented by the following formula (1) has a good durability against a blue laser beam and which provides a desired liquid crystallinity after polymerization. In formula (1), $E^1$ and $E^2$ are each independently a trans-1,4-cyclohexylene group or a trans-2,6-decahydronaphthalene group, and at least one of $E^1$ and $E^2$ is a trans-2,6-decahydronaphthalene group.

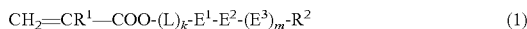

(1)

Now, the liquid crystal compound of the present invention will be described. Here, in this specification, the compound represented by formula (1) is also referred to as liquid crystal compound (1). Other compounds are also referred in the same manner. Further, in this specification, a trans-1,4-cyclohexylene group and a trans-2,6-decahydronaphthalene group may be each a non-substituted group wherein hydrogen atoms bonded to carbon atoms in the group are not substituted by other groups, or they may be each a group wherein hydrogen atoms bonded to carbon atoms may be each substituted by a fluorine atom or a methyl group. Further, when groups having isometric structures to an alkyl group is present, such all groups are referred to as the alkyl group. However, in the present invention, such alkyl groups are preferably linear alkyl groups. Further, in the present invention, a compound having both liquid crystallinity and polymerizability is referred to as a polymerizable liquid crystal. Further, a wavelength described in the specification includes a range of ±2 nm from the wavelength, and a refractive index anisotropy is abbreviated as Δn.

The liquid crystal compound of the present invention is a compound represented by the above formula (1). The liquid crystal compound (1) has both polymerizability and liquid crystallinity.

In the liquid crystal compound (1), $R^1$ is a hydrogen atom or a methyl group, but it is preferably a hydrogen atom. When $R^1$ is a hydrogen atom, it is possible to conduct polymerization quickly at a time of photopolymerizing a polymerizable liquid crystal composition to be described later containing the liquid crystal compound (1) to obtain an optically anisotropic material. Further, there are also merits that properties of an optical element having this optically anisotropic material becomes less susceptible to the environment such as temperature, whereby the variation of retardation in the entire surface of the optical element becomes small.

$R^2$ is a $C_{1-8}$ alkyl group or a fluorine atom. When $R^2$ is such a group, it is possible to lower the melting point ($T_m$: crystal phase-nematic phase phase transition point) of the polymerizable liquid crystal composition containing the liquid crystal compound (1). In particular, $R^2$ is preferably a $C_{2-6}$ alkyl group or a fluorine atom. Further, when $R^2$ is an alkyl group, it preferably has a linear structure in order to widen the temperature range in which the liquid crystal compound (1) shows liquid crystallinity.

In the liquid crystal compound (1), k is 0 or 1.

In the liquid crystal compound (1), L is —$(CH_2)_pCOO$—, —$(CH_2)_qOCO$—, —$(CH_2)_rO$— or —$(CH_2)_s$—, and in particular, L is preferably —$(CH_2)_pCOO$—.

In general, when a polymerizable liquid crystal is polymerized, the value of Δn tends to decrease by polymerization. However, when L is a group containing a polymethylene group such as —$(CH_2)_pCOO$—, —$(CH_2)_qCOO$—, —$(CH_2)_rO$— or —$(CH_2)_s$—, it is possible to suppress the lowering of Δn by polymerization. Further, from the viewpoint of maintaining liquid crystallinity before polymerization, p, q, r and s are each independently preferably an integer of from 2 to 4.

In the liquid crystal compound (1), $E^1$ and $E^2$ are each independently a trans-1,4-cyclohexylene group or a trans-2,6-decahydronaphthalene group. Since a trans-2,6-decahydronaphthalene group has higher viscosity than a trans-1,4-cyclohexylene group, the number of cyclic groups in the liquid crystal compound (1) is preferably at least 3. Specifically, one of $E^1$ and $E^2$ is preferably a trans-2,6-decahydronaphthalene group, and the other one of them is preferably a trans-1,4-cyclohexylene group. In such a construction when a polymerizable liquid crystal composition containing the liquid crystal compound (1) is injected in a cell or when the composition is applied on a substrate, it is possible to form a film having a uniform thickness.

Further, in the above case, the trans-2,6-decahydronaphthalene group is preferably present at a position close to an acrylic main chain after polymerization in order to increase the stability of an optically anisotropic material obtained by the polymerization. For example, a case where $E^1$ is a trans-2,6-decahydronaphthalene group and $E^2$ is a trans-1,4-cyclohexylene group, is better than a case where $E^1$ is a trans-1,4-cyclohexylene group and $E^2$ is a trans-2,6-decahydronaphthalene group.

The liquid crystal compound (1) has a trans-2,6-decahydronaphthalene group, and it preferably further has a trans-1,4-cyclohexylene group. Accordingly, the liquid crystal compound (1) has a low molar extinction coefficient in the wavelength region of a blue laser beam, and has a high durability against a blue laser beam. Accordingly, an optically anisotropic material obtainable from a polymerizable liquid crystal composition employing the liquid crystal compound (1), has sufficient durability against a blue laser beam.

As described above, when structures each having an acryloyloxy group or a methacryloyloxy group and a polymethylene group, are bonded together, it is possible to suppress the lowering of the value of Δn by the polymerization.

By the way, it is known that the liquid crystallinity of the monomer of the polymerizable liquid crystal having a polymethylene group tends to decrease by polymerization as compared with a polymerizable liquid crystal wherein an acryloyloxy group or a methacryloyloxy group is directly bonded to a mesogenic structure. However, since the liquid crystal compound (1) has a trans-2,6-transdecahydronaphthalene group having a high liquid crystallinity, it is possible to maintain a high liquid crystallinity by the monomer before polymerization even if a structure having a polymethylene group is used. On the other hand, in a case of a polymerizable liquid crystal composition wherein an acryloyloxy group or a methacryloyloxy group is directly bonded to a mesogenic structure, a monomer before polymerization has a high liquid crystallinity as compared with a structure having a polymethylene group as described above, and such a polymerizable liquid crystal significantly contributes to expansion of liquid crystallinity of the composition.

As described above, an optical element obtainable by using the liquid crystal compound (1) of the present invention can achieve a good light utilization efficiency when it is used for an optical head device. Namely, by employing the liquid crystal compound (1), it is possible to provide an optical element having a sufficient durability against a blue laser beam and excellent also in the properties such as the phase difference.

As a specific example of the liquid crystal compound (1), the following compound (1A) is mentioned.

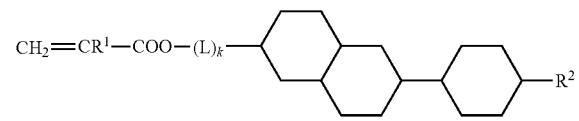

(1A)

In the compound (1A), $R^1$ is preferably a hydrogen atom, k is preferably 0 or 1 and $R^2$ is preferably a $C_{2-6}$ linear alkyl group or a fluorine atom. -L- is preferably —$(CH_2)_pCOO$— or —$(CH_2)_qOCO$— rather than —$(CH_2)_rO$— or —$(CH_2)_s$— in order to obtain wider crystallinity. Further, -L- is particularly preferably —$(CH_2)_pCOO$— (p is particularly preferably an integer of from 2 to 4) in order to reduce the number of process steps at a time of polymerization.

In the trans-1,4-cyclohexylene group and the trans-2,6-decahydronaphthalene group in $E^1$ and $E^2$, hydrogen atoms bonded to carbon atoms in these groups may be each substituted by a fluorine atom or a methyl group. However, in the present invention, the trans-1,4-cyclohexylene group and the trans-2,6-decahydronaphthalene group are each preferably a non-substituted group wherein hydrogen atoms bonded to carbon atoms are not substituted by other groups.

As the compound (1A), the compound shown below is preferred. Here, p is preferably an integer of from 2 to 4. The trans-2,6-decahydronaphthalene group is preferably a trans-2,6-transdecahydronaphthalene group for the purpose of developing liquid crystallinity. $R^2$ represents $C_{1-8}$ alkyl group, and it is preferably a linear $C_{2-6}$ alkyl group.

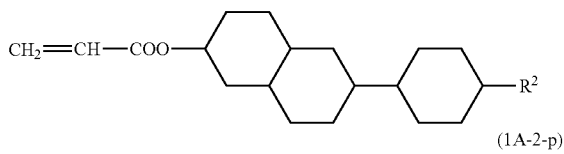

(1A-1)

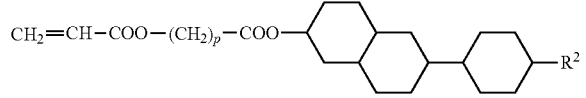

(1A-2-p)

A process for synthesizing the liquid crystal compound (1) of the present invention will be described with reference to specific examples. Here, it is a matter of course that the compound can be synthesized by a process other than the process described below. Further, symbols in formulas are the same as those described above.

<Synthesis of Compound (1A-1)>

First, the following compound (11) is made to react with pyrrolidine, methyl vinyl ketone and acetic acid-sodium acetate aqueous solution in this order, to obtain the following compound (12). Next, the compound (12) is reduced by sodium borohydride under the presence of N,N,N',N'-tetramethylethylenediamine, and as the case requires, the reduced compound is made to react with a hydrogen gas under the presence of palladium-activated carbon to obtain the following compound (13). Next, the compound (13) is made to react with acrylic acid chloride to obtain a compound (1A-1).

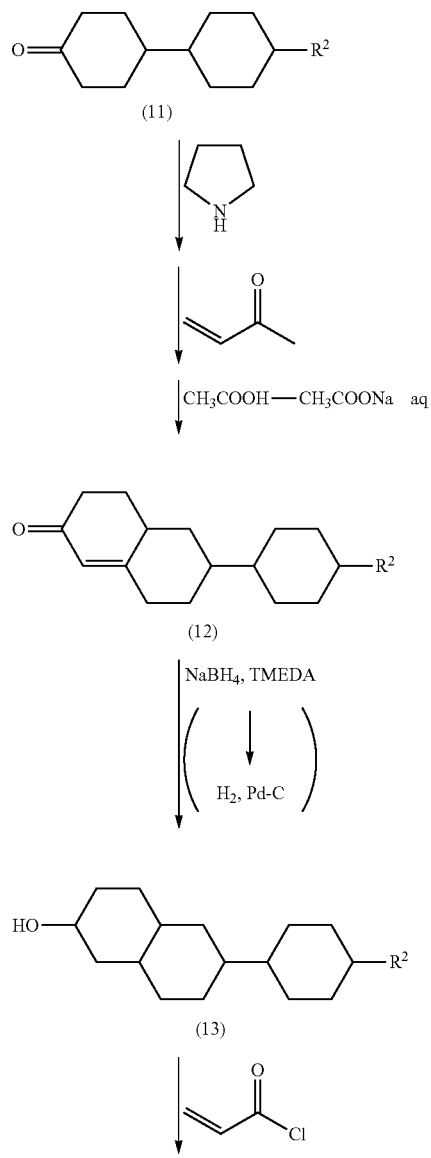

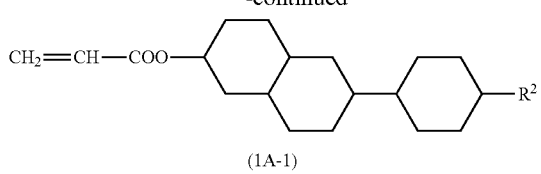

A compound represented by the formula (1) wherein $R^1$ is a methyl group, can also be synthesized in the same manner except that the acrylic acid chloride is replaced by methacrylic acid chloride.

<Synthesis of Compound (1A-2-2)>

The compound (13) is made to react with acrylic acid under the presence of a concentrated sulfuric acid and a polymerization inhibitor in an amount of catalyst.

By this operation, a compound (1A-1) and a compound (1A-2-2) that is a compound (1A-2-p) wherein p=2, are obtained.

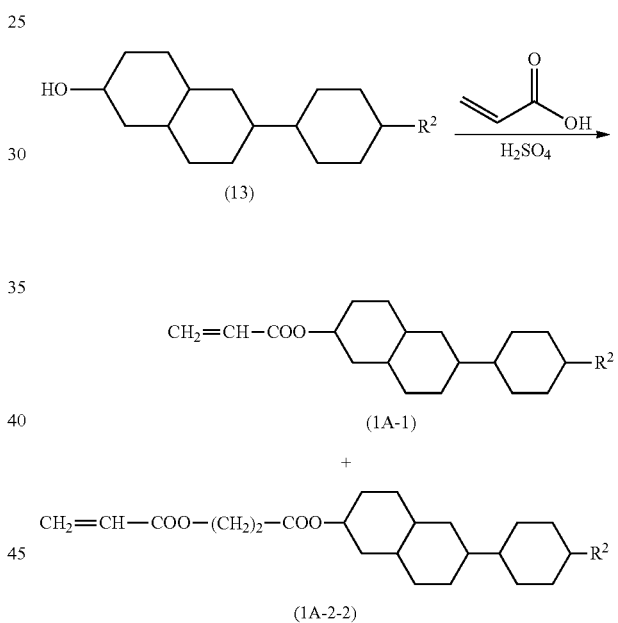

<Synthesis of Compound (1A-2-3)>

The following compound (13) is made to react with 4-bromo butyric acid chloride to obtain the following compound (14). Next, using hexamethyl phosphoric acid triamide (HMPA), the compound (14) is made to react with sodium acrylate. By this operation, a compound (1A-2-3) that is a compound (1A-2-p) wherein p=3, is obtained.

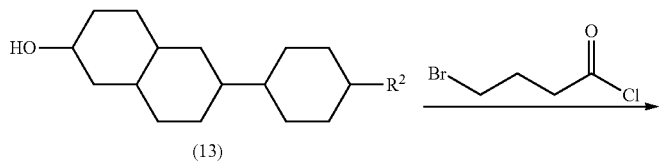

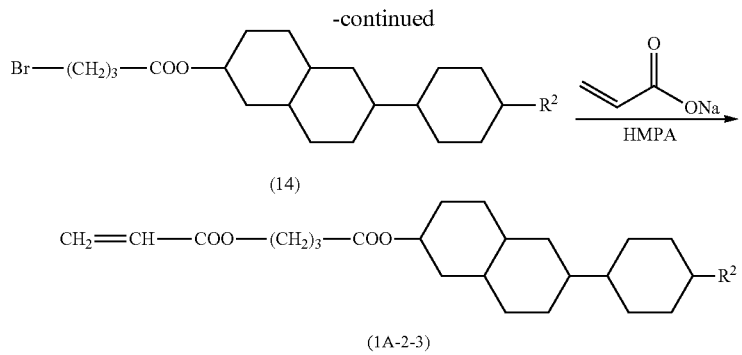

(14)

(1A-2-3)

The liquid crystal compound (1) of the present invention is preferably used as a component of a polymerizable liquid crystal composition for obtaining an optically anisotropic material. The liquid crystal compound (1) alone shows liquid crystallinity in a sufficiently wide temperature range. Accordingly, a polymerizable liquid crystal composition containing at least one type of the liquid crystal compound (1) shows liquid crystallinity in a wide temperature range, and accordingly, its handling is easy. In this case, the polymerizable liquid crystal composition may contain a liquid crystal compound other than the liquid crystal compound (1).

The liquid crystal compound to be contained in the polymerizable liquid crystal composition other than the liquid crystal compound (1), is preferably a compound having an acryloyloxy group or a methacryloyloxy group, particularly preferably a compound having an acryloyloxy group. Further, the liquid crystal compound preferably has a mesogenic structure containing no aromatic ring structure for the purpose of improving durability against a blue laser beam. However, the compound is not limited to such a compound, but for the purpose of expanding liquid crystallinity and maintaining a high Δn and retardation, it may contain an aromatic ring structure.

As the polymerizable liquid crystal compound other than the liquid crystal compound (1) or the polymerizable non-liquid crystal compound having a similar structure, various types of known compounds may be employed. Preferred examples of them include a single functional compound 2A) and a dual functional compound (2B) as shown below.

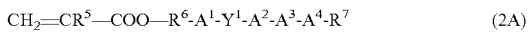

(2A)

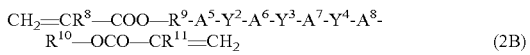

(2B)

$R^5$, $R^8$ and $R^{11}$ each independently represents a hydrogen atom or a methyl group.

$R^6$, $R^9$ and $R^{10}$ each independently represents a single bond or a $C_{1-15}$ alkylene group, and when it is an alkylene group, an etheric oxygen atom may be present in a carbon-carbon bond in the alkylene group or at an end of the group to be bonded with a cyclic group, and further, a carboxyl group may be present at an end of the group to be bonded with a cyclic group, and some or all of hydrogen atoms bonded to carbon atoms in the alkylene group may be substituted by fluorine atoms.

$R^7$ represents a $C_{1-12}$ alkyl group, a $C_{1-12}$ alkoxy group, a $C_{1-12}$ alkylcarbonyloxy group or a fluorine atom, and when it is the alkyl group, the alkoxy group or the alkylcarbonyloxy group, some or all of hydrogen atoms bonded to carbon atoms in each of these groups may be substituted by fluorine atoms.

$Y^1$ and $Y^2$ each independently represents a single bond or —COO—, $Y^3$ represents a single bond or —CH$_2$—CH$_2$— and $Y^4$ represents a single bond or —COO—.

$A^1$, $A^2$, $A^3$, $A^4$, $A^5$, $A^6$, $A^7$ and $A^8$ each independently represents a single bond, a trans-1,4-cyclohexylene group or a 1,4-phenylene group. Here, the combination of $A^1$, $A^2$, $A^3$, and $A^4$ and the combination of $A^5$, $A^6$, $A^7$ and $A^8$, each independently includes at most two single bonds and at least one trans-1,4-cyclohexylene group, and in each of these groups, there is no three-continuous 1,4-phenylene groups, and some or all of hydrogen atoms in the trans-1,4-cyclohexylene group or the 1,4-phenylene group may be substituted by fluorine atoms.

The polymerizable liquid crystal composition may contain a non-liquid crystal polymerizable compound or a non-polymerizable liquid crystal compound. However, the polymerizable liquid crystal composition preferably contains a polymerizable liquid crystal compound in an amount of at least 50 mass %, more preferably at least 80 mass %. Further, when the polymerizable liquid crystal composition contains at least one type of the polymerizable liquid crystal compound (1) and at least one type of polymerizable liquid crystal compound other than the polymerizable liquid crystal compound (1), the ratio of the amount of the polymerizable liquid crystal compound (1) based on the total amount of the polymerizable liquid crystal compound (1) and polymerizable liquid crystal compound other than the polymerizable liquid crystal compound (1), is preferably from 20 mol % to 100 mol %.

As the non-polymerizable non-liquid crystal compound, an additive such as a polymerization initiator, a polymerization inhibitor, a chiral agent, a UV absorber, an antioxidant, a photostabilizer or a colorant, may, for example, be mentioned. The amount of such additives is preferably at most 5 mass % based on the polymerizable liquid crystal composition, and it is more preferably at most 2 mass %. When other non-polymerizable compounds are added, the amount is within a range not deteriorating the effect of the present invention. Specifically, the amount of such other compounds is preferably at most 10 mass %, more preferably at most 5 mass %.

Next, the optically anisotropic material of the present invention will be described.

The optically anisotropic material of the present invention is a polymer obtainable by polymerizing the polymerizable liquid crystal composition in a state that the composition shows a liquid crystal phase and that the liquid crystal is aligned.

The state that the polymerizable liquid crystal composition shows liquid crystallinity, can be maintained by making the ambient temperature at most the nematic phase-isotropic phase phase transition temperature ($T_c$). However, since Δn of the polymerizable liquid crystal composition is extremely small at a temperature close to $T_c$, the upper limit of the ambient temperature is preferably at most ($T_c$−10).

As the polymerization method, photopolymerization or thermopolymerization etc. may be mentioned. From the viewpoint of easiness of maintaining liquid crystallinity or easiness of curing, photopolymerization is preferred. As light to be used for photopolymerization, UV rays or visible light is preferred. In a case of carrying out photopolymerization, a photopolymerization initiator is preferably employed, and for example, such a photopolymerization initiator is preferably one appropriately selected from the group consisting of an acetophenone, a benzophenone, a benzoin, a benzyl, a Michler ketone, a benzoin alkyl ether, a benzyl dimethyl ketal and a thioxanthene. One or at least two types of photopolymerization initiators may be used in combination. The amount of photopolymerization initiator based on the total amount of the polymerizable liquid crystal composition is preferably from 0.01 to 5 mass %, particularly preferably from 0.01 to 2 mass %.

The optically anisotropic material can be obtained by polymerizing the above-mentioned polymerizable liquid crystal composition in a state that it is sandwiched between a pair of substrates each having a surface on which an alignment treatment is applied. Specific examples will be described as follows.

First, a transparent substrate is prepared. As the transparent substrate, for example, a substrate made of a material having a high transmittance for visible light may be employed. Specifically, it may be a substrate made of an inorganic glass such as an alkaline glass, a non-alkaline glass dr a quartz glass; or a transparent resin such as polyester, polycarbonate, polyether, polysulfone, polyether sulfone, polyvinyl alcohol or a fluoropolymer such as a polyvinyl fluoride. From the viewpoint of high rigidity, a substrate made of an inorganic glass is preferably employed. The thickness of the transparent substrate is not particularly limited, and usually, it may be from 0.2 to 1.5 mm, preferably from 0.3 to 1.1 mm. The transparent substrate may be provided with a surface treatment layer made of an inorganic material or an organic material for the purpose of preventing alkaline elusion, improving adhesiveness, preventing reflection or obtaining a hard coat function.

Next, an alignment treatment is applied to a surface of the transparent substrate. For example, an alignment film is formed on the transparent substrate, and an alignment treatment is applied to the alignment film. The alignment film may be any one so long as it has a function of aligning the liquid crystal. It may, for example, be an organic material such as polyimide, polyamide, polyvinyl alcohol, polyvinyl cinnamate or polystyrene, or an inorganic material such as $SiO_2$ or $Al_2O_3$. The alignment treatment may, specifically, be carried out by e.g. a rubbing method. For example, by rubbing a surface of the alignment film in one direction by using a rubbing cloth made of nylon or rayon, it is possible to make liquid crystal molecules align in the direction. Further, other than the rubbing method, it is possible to uniformly align liquid crystal molecules by oblique vapor deposition of SiO, an ion beam method, a photoalignment film, etc.

Next, an optically anisotropic material is formed on the alignment film. Besides the above transparent substrate (hereinafter referred to as first substrate), a second substrate having a surface on which an alignment film is formed is prepared. This alignment film may be formed in the same manner as one for the first substrate. Next, a mold-releasing treatment is applied or a surface of the second substrate on which the alignment film is formed. The mold-releasing agent may, for example, be a fluoropolymer of fluorosilane type or a fluoropolymer having a fluoroalicyclic structure. Next, on this second substrate, the first substrate is overlaid and they are preliminarily bonded so that a gap is present between them. The overlay is made so that the surface of the second substrate on which the mold-releasing treatment is applied and the surface of the first substrate on which the alignment film is formed, face to the inside to each other. Further, an opening capable of injecting the polymerizable liquid crystal composition from the outside is provided in advance.

Next, through the opening, the polymerizable liquid crystal composition of the present invention is injected between the substrates. This injection may be carried out by a vacuum injection method or a method using a capillary phenomena in the atmospheric air. After the injection of the polymerizable liquid crystal composition, the polymerizable liquid crystal composition is polymerized by radiating light having a predetermined wavelength. As the case requires, a heating treatment may be applied after the radiation of light. Thereafter, by removing the second substrate that has been preliminarily bonded, a structure in which an alignment film and an optically anisotropic material are formed on the first substrate can be obtained. In this embodiment, the polymerizable liquid crystal composition is aligned in a direction substantially parallel with the surface of the first substrate, and the optically anisotropic material in a state that such an alignment is fixed is obtained.

Further, formation of the optically anisotropic material may also be carried out, for example, in the following procedure.

First, a first substrate on which an alignment film is formed and a second substrate on which an alignment film is formed and further a mold-releasing agent is applied, are prepared. Next, on the alignment film formed on the first substrate, a photocurable polymerizable liquid crystal composition is dropped. Thereafter, the second substrate is overlaid on the first substrate so that the surface of the second substrate on which the mold-releasing agent is applied faces to the polymerizable liquid crystal composition. Next, light having a predetermined wavelength is radiated to the polymerizable liquid crystal composition to polymerize the composition. Thereafter, by removing the second substrate, a structure in which the alignment film and the optically anisotropic material are formed on the first substrate can be obtained in the same manner as above.

The optically anisotropic material of the present invention may be employed as a material of an optical element. In the above explanation, only the alignment film is mentioned to simplify the explanation, but it is possible to provide an electrode for the purpose of controlling optical properties, or it is possible to provide a reflective film for the purpose of using the optical element as a reflection type element. Further, depending on the purpose, it is possible to provide a Fresnel lens structure, a grating for diffraction grating, a colored layer for color tone adjustment or a low reflective layer for suppressing stray light etc. on a surface of the substrate.

The optical element of the present invention may have a construction wherein two optical elements are combined. Further, the optical element of the present invention may be combined with another optical element such as a lens, a wavefront correction surface, a phase difference plate, an iris or a diffraction grating, etc. In the case of such a structure may be formed by forming these optical elements each employing two substrates and laminating them, or such a structure may be formed by forming two liquid crystal layers among three substrates.

It is possible to produce a diffraction grating such as a polarizing hologram or an optical element such as a phase difference plate or a wavefront correction element by employing the optically anisotropic material of the present invention. As the polarizing hologram, an example of separating, signal light that is light emitted from a light source and reflected from an information recording plane of an optical disk, to guide such signal light to a photodetector, is mentioned. As the phase difference plate, an example of employing such a phase difference plate as a half wavelength plate for controlling the phase difference of light emitted from a laser light source, or an example of using such a phase difference plate as a quarter wavelength plate to be disposed in an optical path in order to stabilize the output of a laser light source, may, for example, be mentioned. Further, the optically anisotropic material of the present invention is applicable to e.g. a phase difference plate or a polarizer for projector application.

For example, it is possible to constitute a diffraction grating wherein a first member made of a first material containing the optically anisotropic material of the present invention and a second member made of a second material having an isotropic refractive index, are alternately arranged to form a grating shape. By alternately disposing a first member having an optical anisotropy and the second member that is isotropic, light passing through these members causes a diffraction that changes depending on the polarization direction of the light, whereby a diffraction grating having a polarizing dependence is constituted.

The optical element having the optically anisotropic material of the present invention, is suitable to be employed for an optical information writing/reading device for recording an information in an optical recording medium and/or for reading an information recorded in the optical recording medium. Specifically, the optical element of the present invention is suitably disposed in an optical path of laser beam in an information writing/reading device. Particularly, the element is suitable for an optical head for an optical information writing/reading device for BD or HDDVD using a blue laser beam. Besides this application, the optical element can be suitably used as an imaging element in projector application or as a wavelength-variable filter in communication device application.

For example, in an optical information writing/reading device employing the above diffraction grating, light reflected from an optical recording medium is diffracted by the diffraction grating. Here, the optical information writing/reading device may have, besides the diffraction grating, a light source for emitting light to be incident into the diffraction grating, an objective lens for condensing light emitted from the light source on the optical recording medium, a detector for detecting light reflected from the optical recording medium, etc.

Further, the optical information writing/reading device may have a phase difference plate prepared by employing the optically anisotropic material of the present invention. The phase difference plate in this case plays a role of transmitting light from a light source and changing the polarization state of the light reflected at an optical disk. For example, when the phase difference plate is a quarter wavelength plate, the polarization state of light emitted from a light source or light reflected by an optical disk, is transformed by the phase difference plate into circularly polarized light or elliptically polarized light when the above light is linearly polarized light, and into linearly polarized light when the above light is circularly polarized light in terms of the polarization plane. Further, when the phase difference plate is a half wavelength plate instead of quarter wavelength plate, P polarized light is transformed into S polarized light, S polarized light is transformed into P polarized light, circularly polarized light (dextrorotation) is transformed into circularly polarized light (levorotation), and circularly polarized light (levorotation) is transformed into circularly polarized light (dextrorotation).

Figure 7:
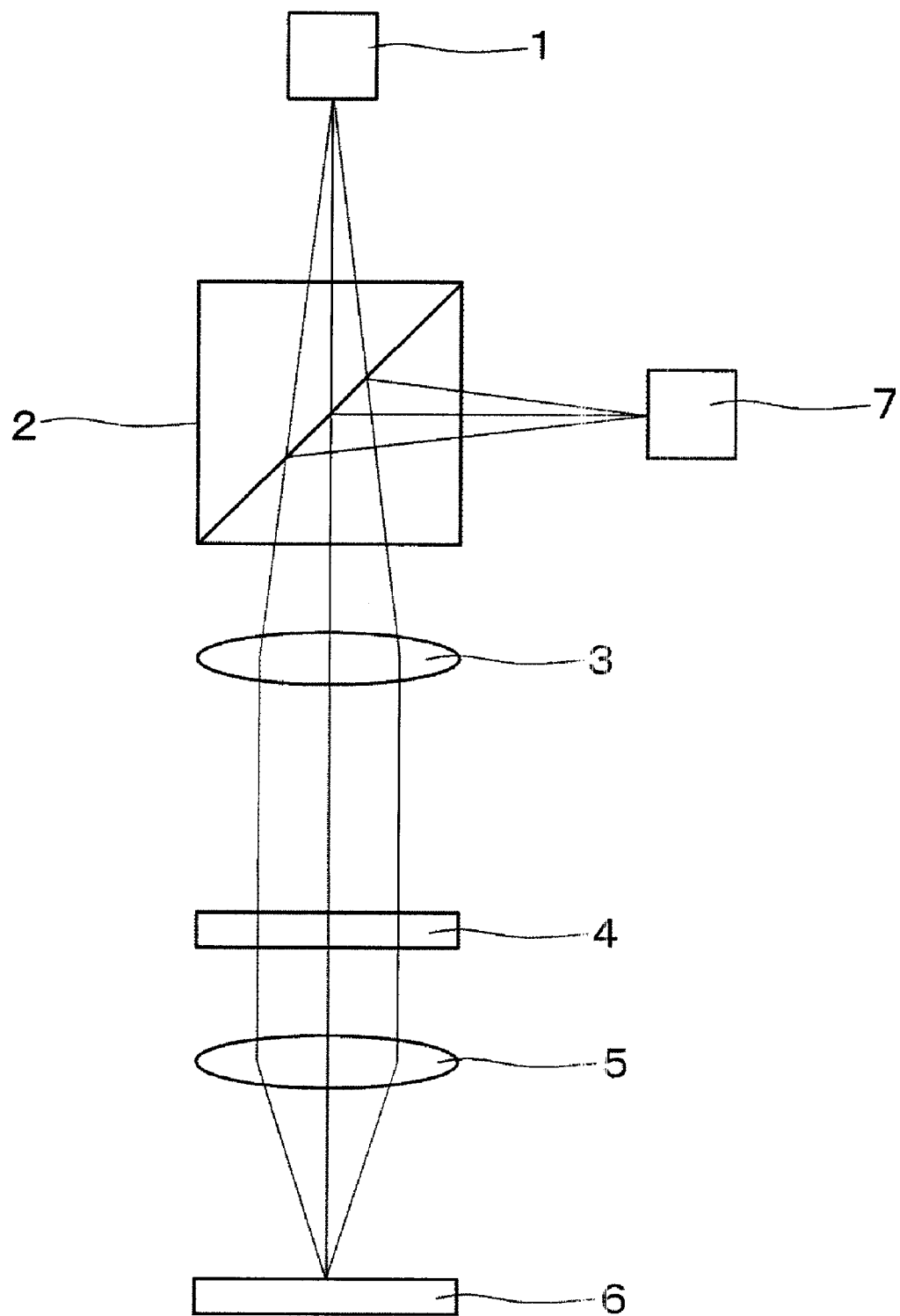
FIG. 7 is a construction view of an optical information writing/reading device of this embodiment.

FIG. 7 shows an example of optical information writing/reading device employing the phase difference plate of the present invention. In this optical information writing/reading device, an information recorded in an optical disk is read out in the following manner.

Linearly polarized light emitted from a light source 1 is transmitted through a beam splitter 2, a collimator lens 3, a phase difference plate 4 and an objective lens 5, and reach an information recording plane of an optical disk 6. In this process, the linearly polarized light is transmitted through the beam splitter with its polarized direction unchanged, and is transformed into circularly polarized light by the phase difference plate 4 having a phase difference of quarter wavelength. Thereafter, the light is reflected at the information recording plane of the optical disk 6 to be transformed into circularly polarized light of reverse direction, and traces back through the objective lens 5, the phase difference plate 4 and the collimator lens 3 in this order through the returning path in the reverse order of the outgoing path. Here, by the phase difference plate 4 in the returning path, the circularly polarized light is transformed into linearly polarized light perpendicular to the linearly polarized light before it is incident into the phase difference plate 4. Accordingly, since the polarization direction of linearly polarized light in the returning path is different from that of the outgoing path by 90°, the propagation direction of the linearly polarized light in the returning path is turned by 90° when it passes through the beam splitter 2, and the light reaches a photodetector 7.

As the light source 1, a normal laser light source to be employed for normal optical information writing/reading device is used.

Specifically, a semiconductor laser is suitable, but it may be any one of other lasers. The phase difference plate 4 has a good durability against a blue laser beam, and accordingly, by using a blue laser beam as a light source, it is possible to increase the capacity of an optical information writing/reading device.

Here, the optically anisotropic material of the present invention may be applied to a beam splitter 2 of FIG. 7. Specifically, the optically anisotropic material is disposed as a polarization-dependent diffraction grating. With such a construction, it is possible to increase the transmittance for light having a polarization direction of outgoing path, and it is possible to increase the diffraction efficiency of light having a polarization direction of returning path that is perpendicular to the polarization direction of outgoing path. Accordingly, it is possible to further improve the light utilization efficiency of the entire optical information writing/reading device.

EXAMPLES

Now, the present invention will be described in further detail with reference to Examples and Comparative Examples, but the present invention is not limited to these Examples.

<Synthesis of Liquid Crystal Compound>

Example 1

First, a compound (12b) was synthesized according to the following equation.

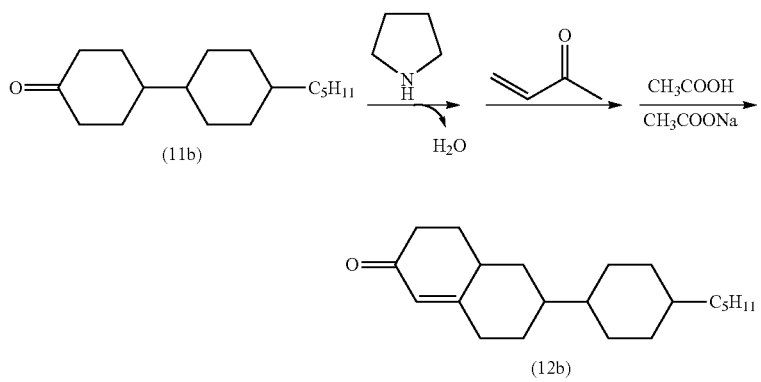

Into a 1,000 mL eggplant-shaped flask provided with a reflux device, a stirring device and a diversion device, 50 g (0.20 mol) of compound (11b), 200 mL of toluene and 36.5 g (0.51 mol) of pyrrolidine were added, and while they are stirred, reflux was carried out at 125° C. for 3 hours. After reaction was completed, the temperature was returned to room temperature and the pyrrolidine and the toluene were removed by evacuation. Then, toluene (200 mL) was added again, such a flask was ice-cooled, and 17.4 g (0.25 mol) of methyl vinyl ketone was dropped. After the dropping, reflux was carried out at 125° C. for 12 hours, and the mixture was gradually cooled to room temperature. Then, an aqueous solution consisting of 8.0 g (0.1 mol) of sodium acetate, 18.0 g (0.3 mol) of acetic acid and 26.6 mL of water, that had been prepared in advance, was added, reflux was carried out again at 125° C. for 6 hours and the mixture was gradually cooled. After reaction was completed, an organic layer was recovered and a water layer was extracted by ethyl acetate and added to the recovered organic layer. The organic layer was rinsed with a 1N hydrochloric acid solution, a saturated sodium hydrocarbonate aqueous solution and a saturated saline solution in this order, and dried by a sodium sulfate anhydride, and the solvent was removed by evacuation to obtain an unpurified compound (12b). The compound was purified by a column chromatography using hexane/ethyl acetate (5:1, volume ratio) as a development solution, and recrystallized with hexane/dichloromethane, to obtain 28.3 g of a compound (12b). The yield was 47%.

Next, from the compound (12b), a compound (13b) was synthesized according to the following equation.

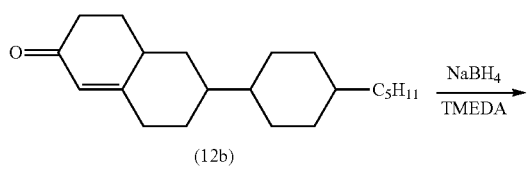

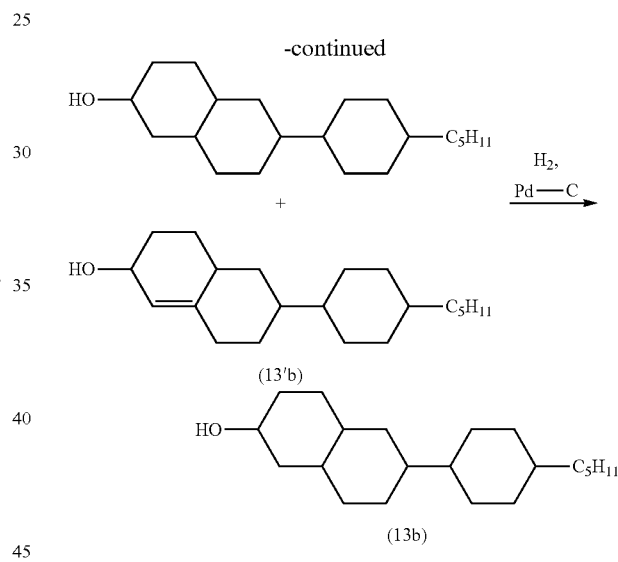

Into a 3,000 mL four-port flask, 7.1 g (0.19 mol) of sodium borohydride was added, and in a flow of nitrogen, 1,500 mL of tetrahydrofuran anhydride, 54.4 g (0.49 mol) of N,N,N', N'-tetramethylethylenediamine and 28.3 g (0.094 mol) of compound (12b) were added in this order. Such a mixture was stirred at 50° C. for 12 hours, and gradually cooled to be room temperature. Thereafter, a 1N hydrochloric acid solution was added while the flask was ice-cooled to stop the reaction, and the post treatment was carried out in the same manner as Example 1 to obtain an unpurified mixture (13' b). The mixture was recrystallized by dichloromethane, and a filtered solution was purified by a column chromatography using hexane/ethyl acetate (4:1, volume ratio) as a development solution. Further, the purified solution was recrystallized by dichloromethane/hexane to obtain 12.6 g of a mixture (13' b).

Next, into a 1,000 mL eggplant-shaped flask, 12.6 g of the mixture (13' b), 300 mL of ethyl acetate, 200 mL of THF and 0.44 g of 10% palladium-activated carbon as a catalyst, were added. Into such a mixture, hydrogen was introduced by using a rubber balloon, and the mixture was stirred at room temperature for 12 hours. After reaction was completed, the reacted product was filtered by silica gel, the palladium catalyst was removed, and a filtered solution was condensed to obtain 12.3 g of a compound (13b). The yield was 43%.

From the compound (13b) obtained in the manner described above, a liquid crystal compound (1A-1b) was synthesized according to the following equation.

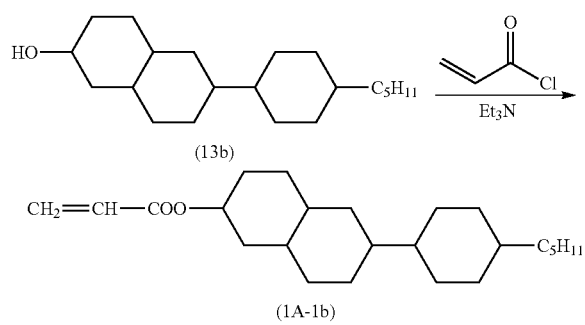

Into a 1,000 mL four-port flask, 5.9 g (19.3 mmol) of the compound (13b) obtained above, 4.0 mL (28.9 mmol) of triethylamine and 350 mL of dichloromethane were added. In a flow of nitrogen, 1.9 mL (22.1 mmol) of acrylic acid chloride was dropped and such a mixture was stirred for 3 hours while the flask was ice-cooled so that the temperature inside the flask did not exceed 20° C. After reaction was completed, the dichloromethane and the acrylic acid chloride was removed by evacuation, and the reminder was purified by a column chromatography using dichloromethane as a developing solvent, and further, the purified product was recrystallized by dichloromethane/hexane to obtain 5.3 g of a liquid crystal compound (1A-1b). The yield was 76%.

FIG. 1 shows an IR spectrum of the liquid crystal compound (1A-1b). Further, the values of $T_m$ and $T_c$ and the $^1$HNMR spectrum are shown below.

$T_m$: 45° C., $T_c$: 158° C. (cooling)

$^1$HNMR (400 MHz, solvent: CDCl$_3$, internal standard: TMS) δ (ppm): 0.76-2.07 (m, 36H), 4.79 (m, 1H), 5.78 (d, 1H), 6.10 (dd, 1H), 6.37 (d, 1H).

Example 2

Using a compound (11a) instead of the compound (11b), a liquid crystal compound (1A-1a) was synthesized in the same manner as the liquid crystal compound (1A-1b).

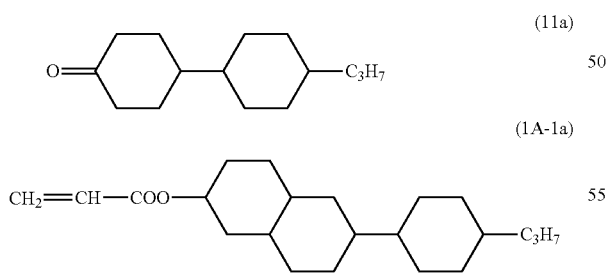

Figure 2:
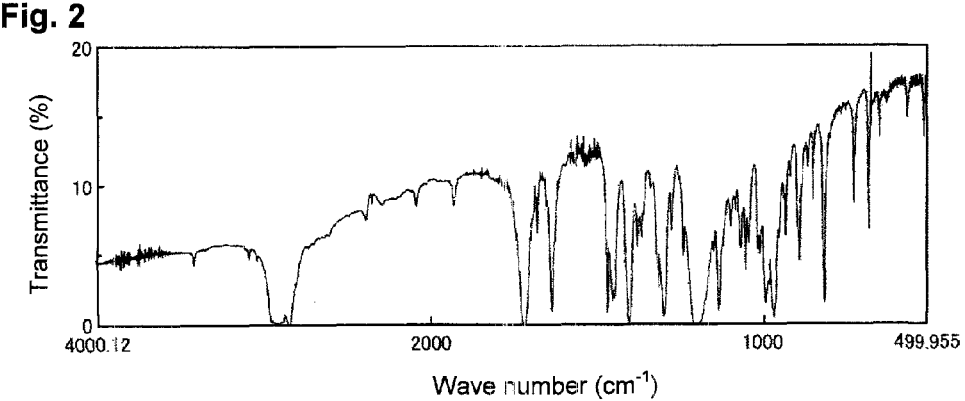
FIG. 2 is a view showing an IR spectrum of compound (1A-1a) of the present invention.

FIG. 2 shows an IR spectrum of the liquid crystal compound (1A-1a).

Example 3

From the compound (13b) obtained in Example 1, a liquid crystal compound (1A-2-2b) was synthesized according to the following equation.

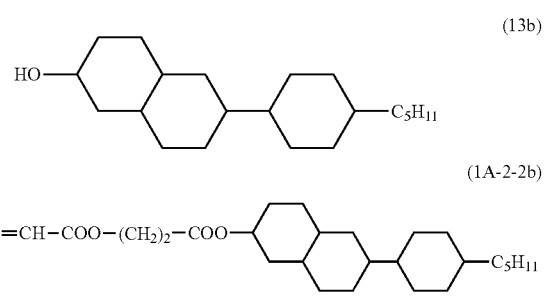

Into a 100 mL three-port flask provided with a reflux device, a stirring device and a diversion device, 3.0 g (9.8 mmol) of compound (13b), 1.7 mL (24.5 mmol) of acrylic acid, 0.03 g (0.24 mmol) of hydroquinone 0.05 mL (1.0 mmol) of a concentrated sulfuric acid and 30 mL of toluene were added and such a mixture was refluxed at 125° C. for 14 hours while it was stirred. After reaction was completed, an organic layer was recovered, it was rinsed with water, a saturated sodium hydrocarbonate aqueous solution and a saturated saline solution in this order, the rinsed organic layer was dried by a sodium sulfate anhydride, and the solvent was removed by evacuation to obtain an unpurified liquid crystal compound (1A-2-2b). It was purified by a column chromatography using dichloromethane as a developing solvent, and recrystallized by dichloromethane/hexane, to obtain 0.4 g of a compound (1A-2-2b). The yield was 10%.

Figure 3:
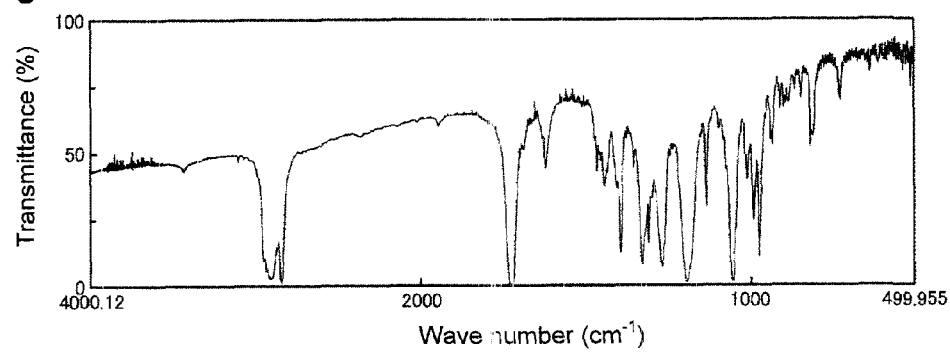
FIG. 3 is a view showing an IR spectrum of compound (1A-2-2b) of the present invention.

FIG. 3 shows an IR spectrum of the liquid crystal compound (1A-2-2b). Further, the values of $T_m$ and $T_c$ and the $^1$HNMR spectrum are shown below.

$T_m$: 30° C., $T_c$: 116° C. (cooling)

$^1$HNMR (400 MHz, solvent: CDCl$_3$, internal standard: TMS) δ (ppm): 0.66-2.00 (m, 36H), 2.65 (t, 2H), 4.42 (t, 2H), 4.76 (m, 1H), 5.83 (d, 1H), 6.11 (dd, 1H), 6.40 (d, 1H).

Example 4

Using a compound (13a) instead of the compound (13b), a liquid crystal compound (1A-2-2a) was synthesized in the same manner as the liquid crystal compound (1A-2-2b).

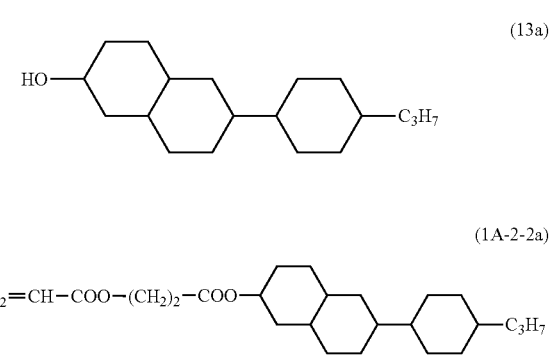

Figure 4:
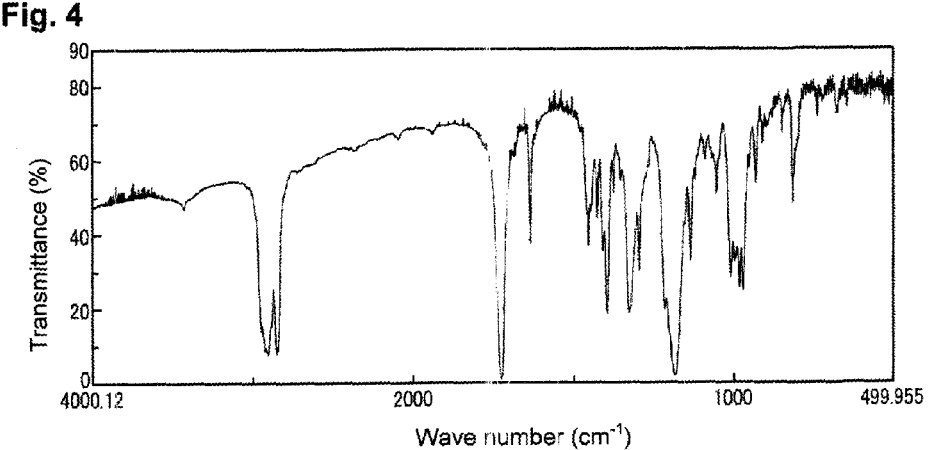
FIG. 4 is a view showing an IR spectrum of compound (1A-2-2a) of the present invention.

FIG. 4 shows an IR spectrum of the liquid crystal compound (1A-2-2a). Further, the values of $T_m$ and $T_c$ are shown below.

$T_m$: 27° C., $T_c$: 107° C. (temperature lowering)

Example 5

First, using a compound (13a), a compound (14a) was synthesized according to the following equation.

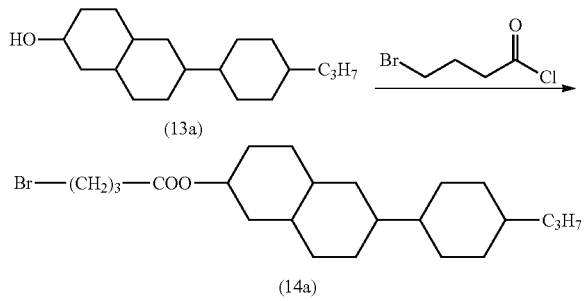

Into a 300 mL four-port flask, 3.5 g (12.7 mmol) of compound (13a), 1.4 mL (17.8 mmol) of pyridine and 80 mL of dichloromethane were added. In a nitrogen flow, 1.9 mL (16.5 mmol) of 4-bromo butyric acid chloride was dropped in a state that the flask was ice-cooled so that the temperature inside of the flask did not exceed 20° C. After 1 hour of stirring in the state of ice cooling, an ammonium chloride aqueous solution was dropped to complete the reaction. An organic layer was recovered, and a water layer was extracted by dichloromethane and added to the recovered organic layer. The organic layer was rinsed with a saturated sodium hydrocarbonate aqueous solution and a saturated saline solution in this order, the rinsed organic layer was dried by sodium sulfate anhydride, and a solvent was removed by evacuation to obtain an unpurified compound (14a). This compound was purified by a column chromatography using dichloromethanehexane/dichloromethane (3:2, volume ratio) as a developing solvent to obtain 5.1 g of a compound (14a). The yield was 93%.

From the compound (14a) thus obtained, a liquid crystal compound (1A-2-3a) was synthesized according to the following equation.

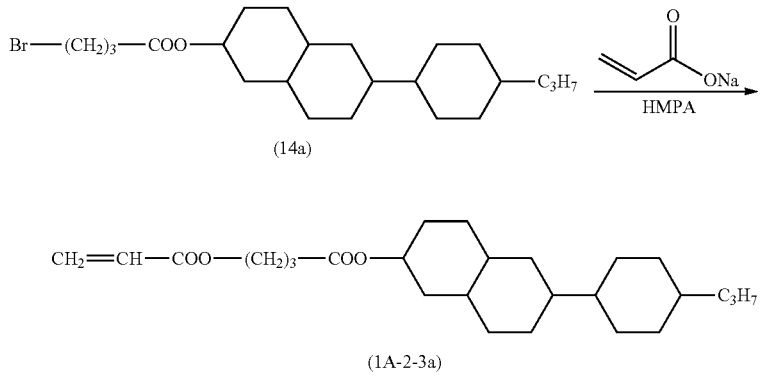

Into a 300 mL eggplant-shaped flask, 5.1 g (11.8 mmol) of compound (14a), 2.2 g (23.6 mmol) of sodium acrylate, 50 mL of hexamethyl phosphoric acid triamide and 15 mL of THF were added. Such a mixture was stirred at 50° C. for 12 hours, and an ammonium chloride aqueous solution was dropped to complete reaction. An organic layer was recovered, and a water layer was extracted by ethyl acetate and added to the recovered organic layer. The organic layer was dried by sodium sulfate anhydride, and a solvent was removed by evacuation to obtain an unpurified compound (1A-2-3a). The compound was purified by a column chromatography using dichloromethane as a developing solvent, and the purified compound was recrystallized by dichloromethane/hexane to obtain 2.9 g of a liquid crystal compound (1A-2-3a). The yield was 59%.

Figure 5:
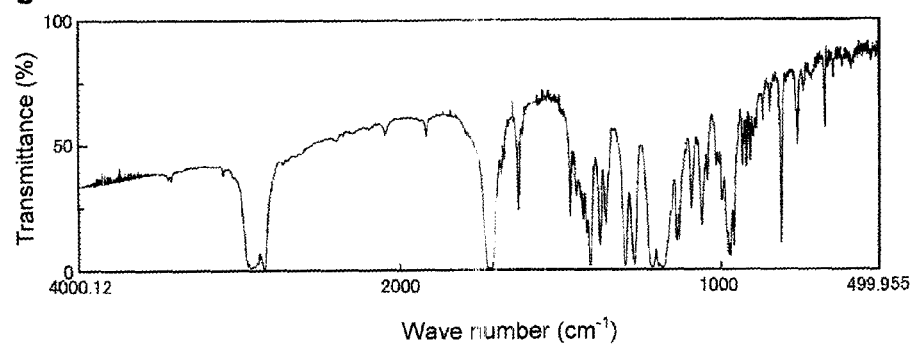
FIG. 5 is a view showing an IR spectrum of compound (1A-2-3a) of the present invention.

FIG. 5 shows an IR spectrum of the liquid crystal compound (1A-2-3a). Further, the values of $T_m$ and $T_c$ and the $^1$HNMR spectrum are shown below.

$T_m$: 28° C., $T_c$: 90° C. (cooling)

$^1$HNMR (400 MHz, solvent: CDCl$_3$, internal standard: TMS) δ (ppm): 0.66-2.02 (m, 34H), 2.38 (t, 2H), 4.19 (t, 2H), 4.72 (m, 1H), 5.83 (d, 1H), 6.11 (dd, 1H), 6.40 (d, 1H).

Example 6

From a compound (13b) instead of the compound (13a), a liquid crystal compound (1A-2-3b) was synthesized in the same manner as the liquid crystal compound (1A-2-3a).

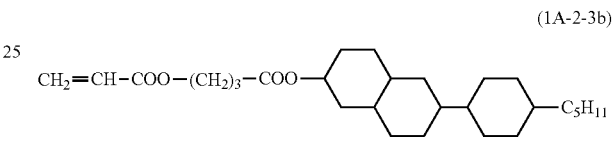

Figure 6:
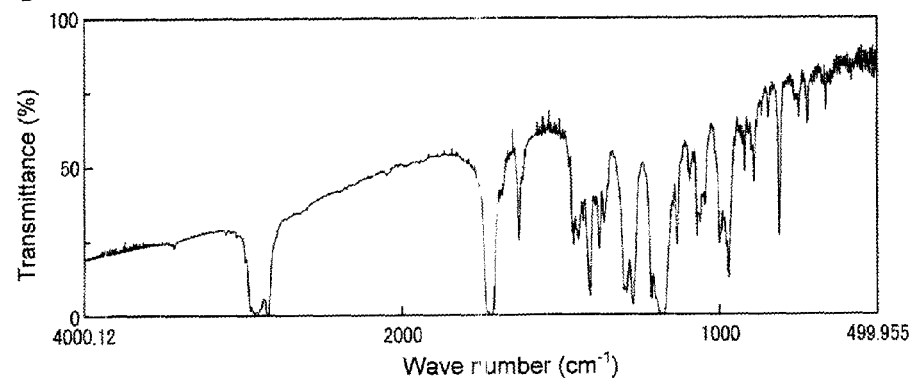
FIG. 6 is a view showing an IR spectrum of compound (1A-2-3b) of the present invention.

FIG. 6 shows the IR spectrum of the liquid crystal compound (1A-2-3b).

Further, the values of $T_m$ and $T_c$ are shown below.

$T_m$ room temperature, $T_c$: 103° C. (cooling)

<Preparation of Polymerizable Liquid Crystal Composition>

Examples 7 to 10

The liquid crystal compounds (1A-1a), (1A-1b), (1A-2-3a) and (1A-2-3b) obtained in Examples 1, 2, 5 and 6 and the following compounds (4-1a), (4-1b) and (4-2) that are other than the above compounds, are mixed at ratios shown in Table 1, to obtain polymerizable liquid crystal compositions A to D. Here, the ratios shown in Table 1 each represents the ratio (mol %) of the polymerizable liquid crystal based on the total polymerizable liquid crystal constituting each polymerizable liquid crystal composition. Further, Table 1 also shows the values of $T_m$ and $T_c$ of each of the polymerizable liquid crystal compositions A to D.

TABLE 1

(4-1a)
CH₂=CH—COO—(CH₂)₄—OCO—⬡—COO—⬡—⬡—C₃H₇

(4-1b)
CH₂=CH—COO—(CH₂)₄—OCO—⬡—COO—⬡—⬡—C₅H₁₁

(4-2)
CH₂=CH—COO—(CH₂)₇—COO—⬡—⬡—OCO—(CH₂)₇—OCO—CH=CH₂

|  |  | Ex. 7 | Ex. 8 | Ex. 9 | Ex. 10 |
|---|---|---|---|---|---|
|  |  | \multicolumn{4}{c}{Polymerizable liquid crystal composition} | | | |
|  |  | A | B | C | D |
| Liquid crystal compound | 1A-1a | 22.5 | 26.5 | 22.5 | — |
|  | 1A-1b | 22.5 | 26.5 | 22.5 | — |
|  | 1A-2-3a | — | — | — | 50 |
|  | 1A-2-3b | — | — | — | 50 |
|  | 4-1a | 12.5 | 8.5 | 7.5 | — |
|  | 4-1b | 12.5 | 8.5 | 7.5 | — |
|  | 4-2 | 30 | 30 | 40 | — |
| $T_m$ (°C.) |  | 67 | 43 | 56 | At most room temperature |
| $T_c$ (°C.) |  | 92 | 92 | 81 | 95 |

*$T_m$ and $T_c$ represent phase transition points in cooling.

The polymerizable liquid crystal compositions A to D each had a wide liquid crystal temperature range and showed a stable nematic liquid crystal phase.

<Preparation of Optical Element>

Examples 11 to 14

On a glass substrate of 5 cm high, 5 cm wide and 0.5 mm thick, a polyimide solution was applied by a spin coater, dried and subjected to a rubbing treatment in a predetermined direction by a nylon cloth to prepare a supporting member.

Subsequently, two such supporting members were laminated together by using an adhesive agent so that the faces of the respective members to which the alignment treatment was applied face to each other, to prepare a cell. Into the adhesive agent, glass beads having a diameter of 3.3 μm were mixed, so that the distance between the supporting members became 4 μm.

Next, to each of the polymerizable liquid crystal compositions A to D prepared in Examples 7 to 10, a polymerization initiator was added in an amount of 0.05 mass % in terms of the ratio based on each of the polymerizable liquid crystal compositions A to D to obtain polymerizable liquid crystal compositions A1 to D1. Here, as the photopolymerization initiator, "IRGACURE 754" (product name) manufactured by Ciba Specialty Chemicals K.K. was employed in each of Examples 11 to 14.

Into the respective cells, the polymerizable liquid crystal compositions A1 to D1 were injected at a temperature of 110° C., and left for 30 minutes at temperatures shown in Table 2. As a result, no separation of crystals were recognized and each of these compositions maintained a stable liquid crystal phase. Thereafter, at polymerization temperatures shown in Table 2, UV rays having an intensity of 50 mW/cm² was radiated so that the integrated light amount became 9,000 mJ/cm² to photopolymerize the compositions to obtain optical elements A to D.

In each of the optical elements A to D, the liquid crystal was horizontally aligned in the rubbing direction of the substrate. Further, each of the optical elements A to D were transparent in the visible region and no scattering was recognized. Further, the values of Δn of these elements for a laser beam having a wavelength of 405 nm were 0.0378, 0.0358, 0.0415 and 0.0451, respectively. Table 2 shows the results.

TABLE 2

|  |  | Ex. 11 Optical element A | Ex. 12 Optical element B | Ex. 13 Optical element C | Ex. 14 Optical element D |
|---|---|---|---|---|---|
| Preparation conditions | Cell gap (μm) | 3.3 | 3.3 | 3.3 | 3.3 |
|  | Status after injection | Stable liquid crystal phase | Stable liquid crystal phase | Stable liquid crystal phase | Stable liquid crystal phase |
|  | Polymerization temperature (°C.) | 70 | 80 | 70 | Room temperature |
|  | UV intensity (mW/cm²) | 50 | 50 | 50 | 50 |
|  | Integrated light amount (mJ/cm²) | 9000 | 9000 | 9000 | 9000 |

TABLE 2-continued

|  |  | Ex. 11 Optical element A | Ex. 12 Optical element B | Ex. 13 Optical element C | Ex. 14 Optical element D |
|---|---|---|---|---|---|
| Evaluation | Transparency | Transparent | Transparent | Transparent | Transparent |
|  | Alignment of liquid crystal | Horizontal alignment | Horizontal alignment | Horizontal alignment | Horizontal alignment |
|  | Δn (λ = 405 nm) | 0.0378 | 0.0358 | 0.0415 | 0.0451 |

<Evaluation of Optical Element>

Example 15

To each of optical elements A to D obtained in Examples 11 to 14, a Kr laser beam (multimode of wavelengths 407 nm and 413 nm) was radiated to conduct a blue laser beam exposure acceleration test. The radiation conditions were such that the temperature was 80° C. and the integrated exposure energy was 30 W·hr/mm². The lowering rate of Δn, that is the ratio of Δn after the acceleration test to Δn before the test, was less than 1% in each Example. Further, an aberration of the exposed portion was measured after the acceleration test, and as a result, the difference between the maximum value and the minimum value of the aberration of the portion was less than 10 mλ in each Example. Here, λ corresponds to the wavelength 405 nm of the measurement light. From these results, it was confirmed that each of the optical elements A to D was excellent in the durability against a blue laser beam.

<Preparation of Polymerizable Liquid Crystal Composition>

Comparative Examples 1 to 3

The following compounds (3-1a), (3-1b), (4-1a), (4-1b) and (4-2) were mixed at ratios shown in Table 3 to obtain polymerizable liquid crystal compositions E to G. Here, the ratios in Table 3 each represents the ratio (mol %) of the polymerizable liquid crystal composition to the total polymerizable liquid crystal constituting each polymerizable liquid crystal composition. Further, Table 3 also shows the values of $T_m$ and $T_c$ of the polymerizable liquid crystal compositions E to G.

TABLE 3

(3-1a)

(3-1b)

|  |  | Comp. Ex. 1 | Comp. Ex. 2 | Comp. Ex. 3 |
|---|---|---|---|---|
|  |  | Polymerizable liquid crystal composition | | |
|  |  | E | F | G |
| Liquid crystal compound | 3-1a | 26.5 | 22.5 | 50 |
|  | 3-1b | 26.5 | 22.5 | 50 |
|  | 4-1a | 8.5 | 7.5 | — |
|  | 4-1b | 8.5 | 7.5 | — |
|  | 4-2 | 30 | 40 | — |

TABLE 3-continued (3-1a)

(3-1b)

|  | Comp. Ex. 1 | Comp. Ex. 2 | Comp. Ex. 3 |
|---|---|---|---|
|  | Polymerizable liquid crystal composition | | |
|  | E | F | G |
| $T_m$ (° C.) | 51 | 70 | 30 |
| $T_c$ (° C.) | 74 | — | 97 |

*$T_m$ and $T_c$ represent phase transition points in cooling.
**Polymerizable liquid crystal composition F did not show liquid crystallinity.

The polymerizable liquid crystal compositions E and G showed a nematic liquid crystal phase, but the polymerizable liquid crystal composition F did not show a nematic liquid crystal phase.

Comparative Example 4

The following compounds (5-1a) and (5-1b) were mixed at a ratio of 1:1 (molar ratio) to prepare a polymerizable liquid crystal composition H. The polymerizable liquid crystal composition H showed a nematic liquid crystal phase.

$CH_2$=CH—COO-Ph-OCO-Cy-$C_3H_7$ (5-1a)

$CH_2$=CH—COO-Ph-OCO-Cy-$C_5H_{11}$ (5-1b)

Comparative Example 5

The liquid crystal compounds (5-1a), (5-1b), (3-1a) and (3-1b) were mixed at a ratio of 1:1:1:1 (molar ratio) to prepare a polymerizable liquid crystal composition I. The polymerizable liquid crystal composition I showed a nematic liquid crystal phase.

<Preparation of Optical Element>

Comparative Examples 6 to 9

To the polymerizable liquid crystal compositions E and G to I prepared in Comparative Examples 1 and 3 to 5, a polymerization initiator was added in an amount of from 0.05 to 0.2 mass % in terms of the ratio: to the polymerizable liquid crystal composition E as shown in Table 4, to obtain polymerizable liquid crystal compositions E1 and G1 to I1. Here, as the photopolymerization initiator, "IRGACURE 754" (product name) manufactured by Ciba Specialty Chemicals K.K. was used for E and G, and "IRGACURE 907" (product name) manufactured by Ciba Specialty Chemicals K.K. was used for H and I.

Into respective cells prepared in the same manner as Example 11, the above polymerizable liquid compositions E1 and G1 to I1 were injected as shown in Table 4, they were left at polymerization temperatures or 30 minutes, and UV rays were radiated to carry out photopolymerization to obtain optical elements E and G to I.

TABLE 4

|  |  | Comp. Ex. 6 Optical element E | Comp. Ex. 7 Optical element G | Comp. Ex. 8 Optical element H | Comp. Ex. 9 Optical element 1 |
|---|---|---|---|---|---|
| Preparation conditions | Polymerizable liquid crystal composition | E1 | G1 | H1 | I1 |
|  | Photo-polymerization initiator | 0.05 | 0.05 | 0.2 | 0.2 |
|  | Injection temperature (° C.) | 100 | 100 | 70 | 70 |
|  | Status after injection | Partial precipitation of crystals | Stable liquid crystal phase | Stable liquid crystal phase | Stable liquid crystal phase |
|  | Polymerization temperature (° C.) | 70 | 70 | 30 | 30 |
|  | UV intensity (mW/cm$^2$) | 50 | 50 | 80 | 80 |
|  | Integrated light amount (mJ/cm$^2$) | 9000 | 9000 | 5300 | 5300 |
| Evaluation | Transparency | Partially scattering |  | Transparent | Transparent |
|  | Alignment of liquid crystal | Horizontal alignment | No liquid crystallinity | Horizontal alignment | Horizontal alignment |
|  | Δn (λ = 405 nm) | 0.0349 |  | 0.0352 | 0.0403 |

In the optical element E, crystals were partially separated when the composition was left at a polymerization temperature of 70° C. for 30 minutes. Further, in a portion where liquid crystallinity is maintained, the liquid crystal was horizontally aligned in the rubbing direction of substrates, but it was confirmed that partial scattering of light occurred by the separation of crystals. Further, Δn for a laser beam having a wavelength of 405 nm was 0.0349. In the optical element G, a stable liquid crystal phase was observed before polymerization, but the optical element G obtained by polymerization did not have liquid crystallinity. In the optical element H, Δn for a laser beam having a wavelength of 568 nm was 0.0352, and the element was transparent in the visible light region and no scattering was recognized. In the optical element I, Δn for a laser beam having a wavelength of 405 nm was 0.0403, the element was transparent in the visible light region and no scattering was recognized.

<Evaluation of Optical Element>

Comparative Example 10

To the optical elements H and I obtained in Comparative (Examples 8 and 9, a Kr laser beam (multimode of wavelengths 407 nm and 413 nm) was radiated to conduct a blue laser beam exposure acceleration test. The radiation conditions was such that the temperature was 80° C. and the integrated exposure energy was 15 W·hr/mm$^2$. With respect to the optical element H, measurement of aberration in the exposed portion was conducted after the acceleration test, and as a result, the difference between the maximum value and the minimum value of the aberration of the portion was at least 300 mλ. Here, λ corresponds to the wavelength 405 nm of the measurement light. Further, with respect to the optical element I, the aberration of the exposed portion was measured after the acceleration test, and as a result, the difference between the maximum value and the minimum value of the aberration of the portion was at least 100 mλ. Here, λ corresponds to the wavelength 405 nm of the measurement light.

INDUSTRIAL APPLICABILITY

The compound of the present invention and the optically anisotropic material obtainable by polymerizing a liquid crystal composition containing the composition, satisfactorily satisfy properties required for common optical anisotropic materials, and are excellent in the durability against a blue laser beam. Accordingly, an optical element produced by employing the compound according to the present invention, can be suitably employed not only as conventional optical pickup elements, imaging elements and optical elements to be employed for communication devices, but also as diffraction elements for modulating a blue laser beam and a material for e.g. phase plates.

The entire disclosure of Japanese Patent Application No. 2008-149416 filed on Jun. 6, 2008 including specification, claims, drawings and summary is incorporated herein by reference in its entirety.

EXPLANATION OF NUMERALS

1: Light source
2: Beam splitter
3: Collimator lens
4: Phase difference plate
5: Objective lens
6: Optical disk
7: Photodetector

What is claimed is:
1. An optically anisotropic material which is obtained by photopolymerizing a polymerizable a liquid crystal compound represented by the following formula (1):

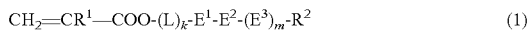

wherein $R^1$ is a hydrogen atom or a methyl group;

$R^2$ is a $C_{1-8}$ alkyl group or a fluorine atom, and when $R^2$ is an alkyl group, an etheric oxygen atom may be present in a carbon-carbon bond or at an end of the group to be bonded to a cyclic group, and a part or all of hydrogen atoms may be substituted by fluorine atoms;

K is 0 or 1;

L is $—(CH_2)_pCOO—$, $—(CH_2)_qOCO—$, $—(CH_2)_rO—$ or $—(CH_2)_s—$ (wherein p, q, r and s are each independently an integer of from 1 to 8);

$E^1$ and $E^2$ are each independently a trans-1,4-cyclohexylene group or a trans-2,6-decahydronaphthalene group, and at least one of $E^1$ and $E^2$ is a trans-2,6-decahydronaphthalene group (wherein in the trans-1,4-cyclohexylene group and the trans-2,6-decahydronaphthalene group in $E^1$ and $E^2$, hydrogen atoms bonded to carbon atoms in the groups may be each substituted by a fluorine atom or a methyl group);

$E^3$ is a trans-1,4-cyclohexylene group or a 1,4-phenylene group (wherein in the trans-1,4-cyclohexylene group and the 1,4-phenylene group in $E^3$, hydrogen atoms bonded to carbon atoms in these groups may be each substituted by a fluorine atom or a methyl group); and m is 0 or 1.

2. The optically anisotropic material according to claim 1, wherein $E^1$ is a trans-2,6-decahydronaphthalene group, and $E^2$ is a trans-1,4-cyclohexylene group.

3. The optically anisotropic material according to claim 2, which is represented by the following formula (1A):

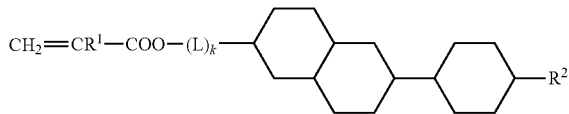

(1A)

wherein $R^1$ is a hydrogen atom, and
$R^2$ is a $C_{2-6}$ linear alkyl group or a fluorine atom.

4. The optically anisotropic material according to claim 3, wherein k is 1 and L is
$—(CH_2)_pCOO—$ or $(CH_2)_qOCO—$.

5. The optically anisotropic material according to claim 4, wherein L is $—(CH_2)_pCOO—$ wherein p is an integer of from 2 to 4.

6. The optically anisotropic material according to claim 3, wherein k is 0.

7. An optical element having the optically anisotropic material as defined in claim 1.

8. An optical information writing/reading device for recording an information in an optical recording medium and/or reading an information recorded in an optical recording medium, which has the optical element as defined in claim 7.

* * * * *